United States Patent
Noguchi

(10) Patent No.: US 12,440,189 B2
(45) Date of Patent: Oct. 14, 2025

(54) ULTRASOUND DIAGNOSTIC APPARATUS AND CONTROL METHOD OF ULTRASOUND DIAGNOSTIC APPARATUS

(71) Applicant: FUJIFILM Corporation, Tokyo (JP)

(72) Inventor: Masafumi Noguchi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 112 days.

(21) Appl. No.: 18/170,243

(22) Filed: Feb. 16, 2023

(65) Prior Publication Data
US 2023/0190237 A1   Jun. 22, 2023

Related U.S. Application Data

(63) Continuation of application No. PCT/JP2021/027704, filed on Jul. 27, 2021.

(30) Foreign Application Priority Data

Aug. 27, 2020 (JP) ................. 2020-143275

(51) Int. Cl.
*A61B 8/00* (2006.01)
*A61B 8/08* (2006.01)
*A61B 8/14* (2006.01)

(52) U.S. Cl.
CPC .......... *A61B 8/5207* (2013.01); *A61B 8/0825* (2013.01); *A61B 8/085* (2013.01);
(Continued)

(58) Field of Classification Search
CPC ..... A61B 8/5207; A61B 8/0825; A61B 8/085; A61B 8/0858; A61B 8/14; A61B 8/54
See application file for complete search history.

(56) References Cited

U.S. PATENT DOCUMENTS

| 2006/0029268 A1 | 2/2006 | Endo et al. |
| 2009/0099451 A1 | 4/2009 | Nakaya et al. |

(Continued)

FOREIGN PATENT DOCUMENTS

| JP | 2006-068506 A | 3/2006 |
| JP | 2008-161283 A | 7/2008 |

(Continued)

OTHER PUBLICATIONS

An Office Action; "Notice of Reasons for Refusal," mailed by the Japanese Patent Office on Jul. 30, 2024, which corresponds to Japanese Patent Application No. 2022-545558 and is related to U.S. Appl. No. 18/170,243; with English language translation.
(Continued)

*Primary Examiner* — Keith M Raymond
*Assistant Examiner* — Johnathan Maynard
(74) *Attorney, Agent, or Firm* — Studebaker Brackett PLLC

(57) ABSTRACT

An ultrasound diagnostic apparatus (1) includes an ultrasound probe (2); an image acquisition unit that generates an ultrasound image by performing transmission and reception of an ultrasound beam with respect to a subject using the ultrasound probe (2); and an initial condition setting unit (25) that sets a basic sound speed value for generating the ultrasound image of a breast of the subject on the basis of a ratio of mammary glands in the breast, which is calculated by analyzing a radiation image in which the breast is imaged, in which the image acquisition unit generates the ultrasound image of the breast using the basic sound speed value.

16 Claims, 4 Drawing Sheets

(52) U.S. Cl.
CPC .............. *A61B 8/0858* (2013.01); *A61B 8/14* (2013.01); *A61B 8/54* (2013.01)

(56) References Cited

U.S. PATENT DOCUMENTS

| | | | |
|---|---|---|---|
| 2009/0118614 | A1 | 5/2009 | Sendai |
| 2010/0246924 | A1* | 9/2010 | Morita ................... A61B 6/502 382/132 |
| 2013/0338485 | A1* | 12/2013 | Mougenot ................ A61B 5/70 600/411 |
| 2015/0057543 | A1* | 2/2015 | Katsuyama ............ G16H 50/30 600/438 |
| 2015/0265251 | A1* | 9/2015 | Cho ......................... G06T 7/143 600/437 |
| 2017/0172420 | A1* | 6/2017 | Nakamura .......... A61B 5/14542 |
| 2018/0368695 | A1* | 12/2018 | Nakamura .......... G01N 29/2418 |
| 2019/0183349 | A1* | 6/2019 | Miyasato ............ A61B 8/403 |
| 2020/0205749 | A1 | 7/2020 | Fukushima et al. |
| 2020/0237322 | A1* | 7/2020 | Seki ..................... A61B 8/5276 |

FOREIGN PATENT DOCUMENTS

| | | |
|---|---|---|
| JP | 2009-089940 A | 4/2009 |
| JP | 2009-268726 A | 11/2009 |
| JP | 2010-253245 A | 11/2010 |
| JP | 2015-136449 A | 7/2015 |
| JP | 2017-113095 A | 6/2017 |
| JP | 2018-102923 A | 7/2018 |
| JP | 2020-022523 A | 2/2020 |

OTHER PUBLICATIONS

Barr Richard G. et al., "Speed of Sound Imaging: Improved Image Quality in Breast Sonography", Ultrasound Quarterly, vol. 25, No. 3, Sep. 1, 2009, pp. 141-144, doi: 10.1097/RUQ.0b013e3181b789aa, Raven Press, US.

Sak Mark et al., "Relationship between breast sound speed and mammographic percent density", Medical Imaging 2011: Ultrasonic Imaging, Tomography, and Therapy, vol. 7968, No. 1, Mar. 3, 2011, pp. 1-7, doi: 10.1117/12.878934, SPIE, US.

The extended European search report issued by the European Patent Office on Jan. 24, 2024, which corresponds to European Patent Application No. 21861082.2-1126 and is related to U.S. Appl. No. 18/170,243.

An Office Action; "Notice of Reasons for Refusal," mailed by the Japanese Patent Office on Mar. 12, 2024, which. Corresponds to Japanese Patent Application No. 2022-545558 and is related to U.S. Appl. No. 18/170,243; with English language translation.

International Search Report issued in PCT/JP2021/027704; mailed Oct. 19, 2021.

International Preliminary Report On Patentability and Written Opinion issued in PCT/JP2021/027704; issued Feb. 28, 2023.

* cited by examiner

ULTRASOUND DIAGNOSTIC APPARATUS AND CONTROL METHOD OF ULTRASOUND DIAGNOSTIC APPARATUS

CROSS-REFERENCE TO RELATED APPLICATIONS

This application is a Continuation of PCT International Application No. PCT/JP2021/027704 filed on Jul. 27, 2021, which claims priority under 35 U.S.C. § 119(a) to Japanese Patent Application No. 2020-143275 filed on Aug. 27, 2020. The above applications are hereby expressly incorporated by reference, in their entirety, into the present application.

BACKGROUND OF THE INVENTION

1. Field of the Invention

The present invention relates to an ultrasound diagnostic apparatus, and a control method of the ultrasound diagnostic apparatus which are for examining a breast of a subject.

2. Description of the Related Art

In the related art, observation of the inside of a subject is performed by generating an ultrasound image representing tomogram of the subject using an ultrasound diagnostic apparatus. In a case where the ultrasound image is generated, first, an ultrasound beam is transmitted from a transducer array consisting of a plurality of ultrasonic transducers to the inside of the subject, the ultrasound beam is reflected in the subject, and an ultrasound echo is received in the transducer array. The ultrasound image is generated by correcting the difference in propagation time until the ultrasonic wave emitted from the ultrasonic transducer returns to the same ultrasonic transducer via a reflection point in the subject, for an echo signal received by each ultrasonic transducer of the transducer array, and then adding each echo signal.

The propagation time of the ultrasonic wave is calculated on the basis of the length of the path of the ultrasonic wave and the sound speed in a medium in the subject. The difference between the value of the sound speed used in the calculation and the value of the actual sound speed in the medium is known to cause degradation in the resolution of the ultrasound image. In the human body, the sound speed is about 1550 m/s in the liver and the like, is 1420 m/s in fat, and has different values depending on the tissues. Therefore, in order to improve the resolution of the ultrasound image, for example, as disclosed in JP2015-136449 Å, a technique of changing the sound speed value used for the calculation in the fat layer and the other layers has been developed.

SUMMARY OF THE INVENTION

The examination of the breast of the subject is performed by using the ultrasound diagnostic apparatus. It is generally known that the breast includes a fat layer, a mammary gland layer, and a muscle layer. Among these, in the mammary gland layer, mammary glands and fat are mixed, and the ratio of fat in the mammary gland layer varies depending on the subject due to individual differences, an increase of fat with age, and the like. Thus, as in the technique disclosed in JP2015-136449A, even in a case where a constant sound speed value is applied to the mammary gland layer, the applied sound speed value is not necessarily an optimal value, and the ultrasound image that clearly shows the mammary gland layer may not be obtained.

Even in a case where an optimal sound speed value for the mammary gland layer is tried to be calculated by calculating the presence ratio of the mammary gland and fat in the mammary gland layer from the ultrasound image, since the entire mammary gland layer is depicted in the ultrasound image with high brightness regardless of the ratio of mammary glands in the mammary gland layer, it is difficult to calculate the presence ratio of the mammary gland and fat in the mammary gland layer from the ultrasound image.

The present invention has been made in order to solve such a problem in the related art, and an object of the present invention is to provide an ultrasound diagnostic apparatus and a control method of the ultrasound diagnostic apparatus which can improve the resolution of the ultrasound image of the mammary gland layer.

An ultrasound diagnostic apparatus according to an aspect of the present invention includes an ultrasound probe; an image acquisition unit that generates an ultrasound image by performing transmission and reception of an ultrasound beam with respect to a subject using the ultrasound probe; and an initial condition setting unit that sets a basic sound speed value for generating the ultrasound image of a breast of the subject on the basis of a ratio of mammary glands in the breast, which is calculated by analyzing a radiation image in which the breast is imaged, in which the image acquisition unit generates the ultrasound image of the breast using the basic sound speed value.

The initial condition setting unit can set a basic sound speed value V1 (m/s) by $V1=[R1 \times V11+(100-R1) \times V12]/100$ using a ratio $R1(\%)$ of the mammary glands, a mammary gland sound speed value V11 (m/s) determined for the mammary glands, and a fat sound speed value V12 (m/s) determined for fat.

The ultrasound diagnostic apparatus can further include an extraction unit that extracts a fat layer and a mammary gland layer by analyzing the ultrasound image of the breast.

In this case, the image acquisition unit can generate the ultrasound image using the basic sound speed value for the mammary gland layer extracted by the extraction unit.

Alternatively, the image acquisition unit can generate the ultrasound image using the fat sound speed value different from the basic sound speed value for the fat layer extracted by the extraction unit.

The extraction unit can extract a muscle layer by analyzing the ultrasound image of the breast, and the image acquisition unit can generate the ultrasound image using a muscle sound speed value that is different from the basic sound speed value and the fat sound speed value and is determined for muscle, for the extracted muscle layer.

The ultrasound diagnostic apparatus can further include an input device for inputting the ratio of the mammary glands calculated by analyzing the radiation image, and in this case, the initial condition setting unit can set the basic sound speed value using the ratio of the mammary glands input via the input device.

Alternatively, the ultrasound diagnostic apparatus can further include an input device for inputting the radiation image; and a mammary gland ratio calculation unit that calculates the ratio of the mammary glands by analyzing the radiation image input via the input device, and in this case, the initial condition setting unit can set the basic sound speed value using the ratio of the mammary glands calculated by the mammary gland ratio calculation unit.

As the ratio of the mammary glands, a ratio of a volume of the mammary glands in a breast region with respect to a volume of the breast in the breast region can be used.

Further, it is preferable that the ratio of the mammary glands is a ratio of a volume of the mammary glands in a mammary gland region with respect to a volume of the breast in the mammary gland region.

Alternatively, the ratio of the mammary glands can be represented by a ratio R1 of a volume of the mammary glands in a mammary gland region with respect to a volume of the breast in the mammary gland region, and a ratio R2 of a thickness of a mammary gland layer in the mammary gland region with respect to a breast thickness in the mammary gland region obtained by tomosynthesis.

In this case, the initial condition setting unit can set a basic sound speed value V1 (m/s) by $V1=(R1/R2) \times V11+(1-R1/R2) \times V12$ using the ratio R1(%) of the volume of the mammary glands, the ratio R2 of the thickness of the mammary gland layer, a mammary gland sound speed value V11 (m/s) determined for the mammary glands, and a fat sound speed value V12 (m/s) determined for fat.

A control method of an ultrasound diagnostic apparatus according to an aspect of the present invention includes setting a basic sound speed value for generating an ultrasound image on the basis of a ratio of mammary glands in a breast of a subject, which is calculated by analyzing a radiation image in which the breast is imaged; and generating the ultrasound image of the breast using the basic sound speed value.

According to the present invention, the ultrasound diagnostic apparatus includes the initial condition setting unit that sets the basic sound speed value for generating the ultrasound image of the breast of the subject on the basis of the ratio of the mammary glands in the breast, which is calculated by analyzing the radiation image in which the breast is imaged, and the image acquisition unit generates the ultrasound image of the breast using the basic sound speed value. Therefore, it is possible to improve the resolution of the ultrasound image of the mammary gland layer.

DESCRIPTION OF THE PREFERRED EMBODIMENTS

Hereinafter, embodiments of the invention will be described with reference to the accompanying drawings.

The description of configuration requirements described below is given on the basis of the representative embodiment of the present invention, but the present invention is not limited to such an embodiment.

In the present specification, a numerical range represented using "to" means a range including the numerical values before and after "to" as a lower limit value and an upper limit value.

In the present specification, the terms "same" and "identical" include an error range generally allowed in the technical field.

First Embodiment

Figure 1:
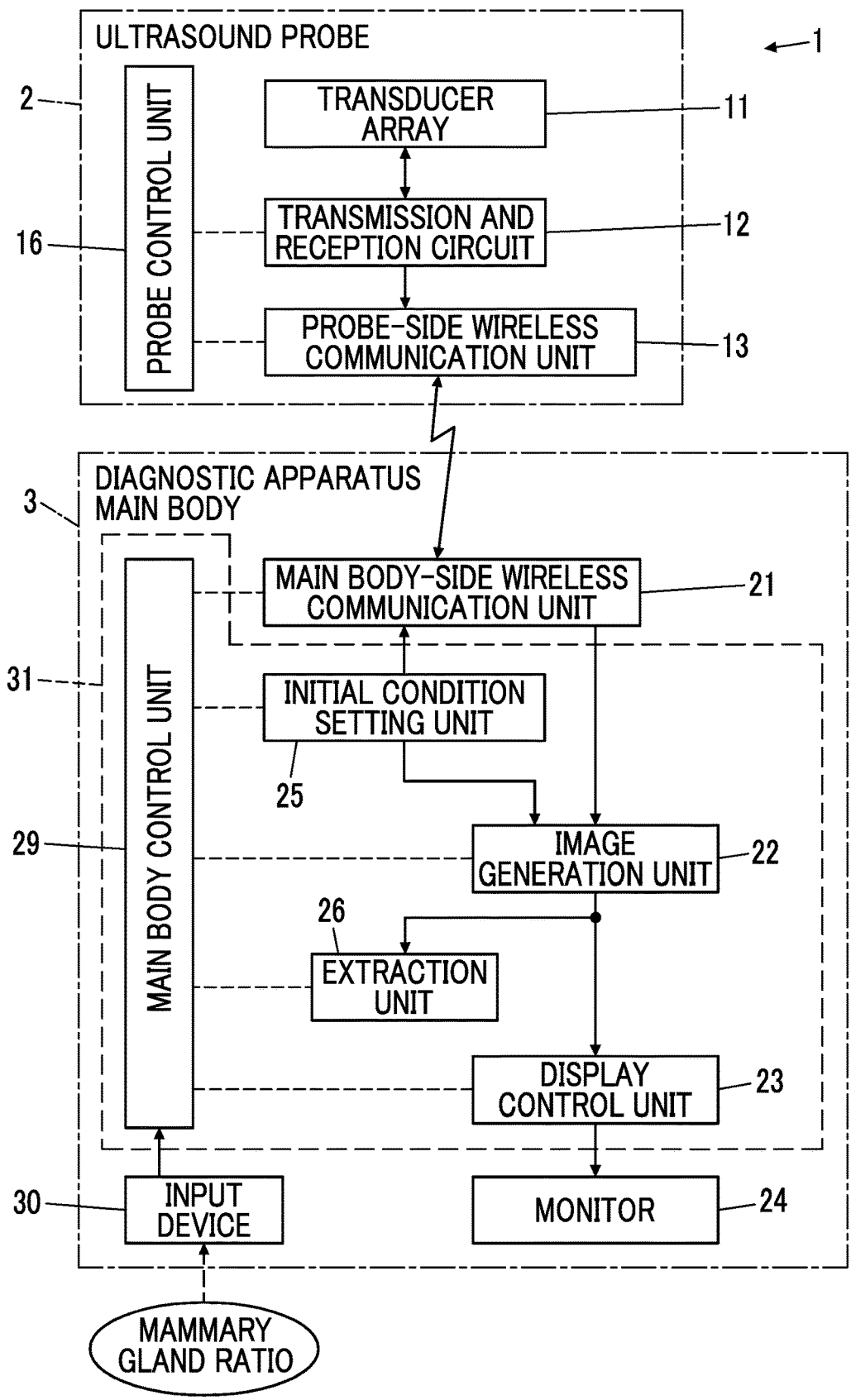
FIG. 1 is a block diagram illustrating a configuration of an ultrasound diagnostic apparatus according to a first embodiment of the present invention.

FIG. 1 illustrates a configuration of an ultrasound diagnostic apparatus 1 according to a first embodiment of the present invention. The ultrasound diagnostic apparatus 1 includes an ultrasound probe 2 and a diagnostic apparatus main body 3. The ultrasound probe 2 and the diagnostic apparatus main body 3 are connected to each other by wireless communication.

The ultrasound probe 2 has a transducer array 11, and a transmission and reception circuit 12 and a probe-side wireless communication unit 13 are sequentially connected to the transducer array 11. The transmission and reception circuit 12 and the probe-side wireless communication unit 13 are connected to a probe control unit 16.

The diagnostic apparatus main body 3 includes a main body-side wireless communication unit 21, and an image generation unit 22, a display control unit 23, and a monitor 24 are sequentially connected to the main body-side wireless communication unit 21. An initial condition setting unit 25 is connected to the main body-side wireless communication unit 21 and the image generation unit 22. An extraction unit 26 is connected to the image generation unit 22. The image generation unit 22 and the transmission and reception circuit 12 of the ultrasound probe 2 constitute an image acquisition unit.

A main body control unit 29 is connected to the main body-side wireless communication unit 21, the image generation unit 22, the display control unit 23, the initial condition setting unit 25, and the extraction unit 26. An input device 30 is connected to the main body control unit 29.

Further, the image generation unit 22, the display control unit 23, the initial condition setting unit 25, the extraction unit 26, and the main body control unit 29 constitute a main body-side processor 31.

The transducer array 11 of the ultrasound probe 2 illustrated in FIG. 1 has a plurality of ultrasonic transducers arranged in a one-dimensional or two-dimensional manner. According to a drive signal supplied from the transmission and reception circuit 12, each of the ultrasonic transducers transmits an ultrasonic wave and receives an ultrasound echo from a subject to output a signal based on the ultrasound echo. For example, each ultrasonic transducer is configured by forming electrodes at both ends of a piezoelectric body consisting of piezoelectric ceramic represented by lead zirconate titanate (PZT), a polymer piezoelectric element represented by poly vinylidene di fluoride (PVDF), piezoelectric single crystal represented by lead magnesium niobate-lead titanate (PMN-PT), or the like.

Figure 2:
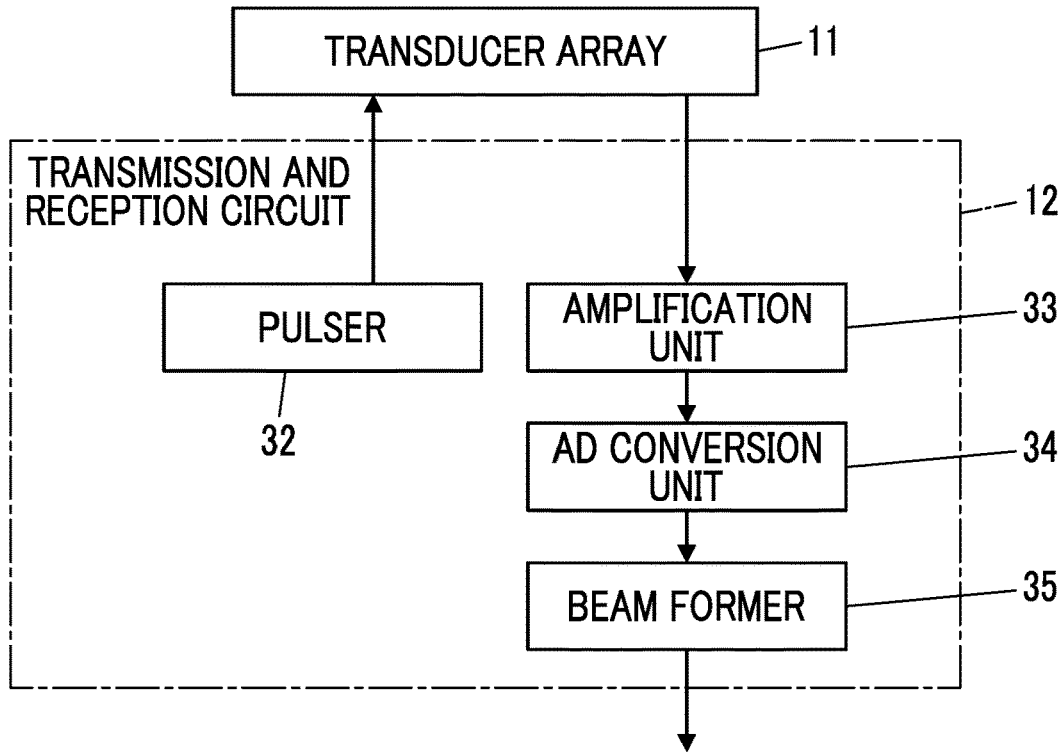
FIG. 2 is a block diagram illustrating a configuration of a transmission and reception circuit in the first embodiment of the present invention.

The transmission and reception circuit 12 causes the transducer array 11 to transmit the ultrasonic wave and generates a sound ray signal on the basis of a reception signal acquired by the transducer array 11, under the control of the probe control unit 16. As illustrated in FIG. 2, the transmission and reception circuit 12 has a pulser 32 connected to the transducer array 11, and an amplification unit 33, an analog digital (AD) conversion unit 34, and a beam former 35 that are sequentially connected in series from the transducer array 11.

The pulser 32 includes, for example, a plurality of pulse generators, and the pulser 32 adjusts the amount of delay of each drive signal so that ultrasonic waves transmitted from the plurality of ultrasonic transducers of the transducer array 11 form an ultrasound beam on the basis of a transmission delay pattern selected according to the control signal from the probe control unit 16, and supplies the obtained signals to the plurality of ultrasonic transducers. Thus, in a case where a pulsed or continuous-wave voltage is applied to the electrodes of the ultrasonic transducers of the transducer array 11, the piezoelectric body expands and contracts to generate pulsed or continuous-wave ultrasonic waves from each ultrasonic transducer. From the combined wave of these ultrasonic waves, an ultrasound beam is formed.

The transmitted ultrasound beam is reflected by a target, for example, a site of the subject, and propagates toward the transducer array 11 of the ultrasound probe 2. The ultrasound echo propagating toward the transducer array 11 in this manner is received by each ultrasonic transducer constituting the transducer array 11. In this case, each ultrasonic transducer constituting the transducer array 11 expands and contracts by receiving the propagating ultrasound echo to generate a reception signal that is an electric signal, and outputs the reception signal to the amplification unit 33.

The amplification unit 33 amplifies the signals input from each ultrasonic transducer constituting the transducer array 11, and transmits the amplified signals to the AD conversion unit 34. The AD conversion unit 34 converts the signal transmitted from the amplification unit 33 into digital reception data. The beam former 35 performs so-called reception focusing processing in which addition is performed by giving delays to respective pieces of the reception data received from the main body-side wireless communication unit 21 according to a basic sound speed value V1 set by the initial condition setting unit 25. The processing of adding delays to respective pieces of the reception data corresponds to correcting the difference in propagation time until the ultrasonic wave emitted from the ultrasonic transducer returns to the same ultrasonic transducer via a reflection point in the subject, in each ultrasonic transducer constituting the transducer array 11. Through the reception focusing processing, a sound ray signal in which each piece of the reception data converted by the AD conversion unit 34 is phased and added and the focus of the ultrasound echo is narrowed is acquired.

The probe-side wireless communication unit 13 is configured by a circuit or the like including an antenna for transmitting and receiving radio waves, and performs wireless communication with the main body-side wireless communication unit 21 of the diagnostic apparatus main body 3 under the control of the probe control unit 16. The probe-side wireless communication unit 13 modulates a carrier on the basis of the sound ray signal generated by the transmission and reception circuit 12, generates a transmission signal representing the sound ray signal, and wirelessly transmits the generated transmission signal to the main body-side wireless communication unit 21 of the diagnostic apparatus main body 3.

As the modulation method of the carrier, for example, amplitude shift keying (ASK), phase shift keying (PSK), quadrature phase shift keying (QPSK), 16 quadrature amplitude modulation (16QAM), and the like is used.

The probe control unit 16 controls each unit of the ultrasound probe 2 on the basis of a program and the like stored in advance.

Although not illustrated, a battery that supplies power to each unit of the ultrasound probe 2 is built in the ultrasound probe 2.

Similarly to the probe-side wireless communication unit 13, the main body-side wireless communication unit 21 of the diagnostic apparatus main body 3 is configured by a circuit or the like including an antenna for transmitting and receiving radio waves, and performs wireless communication with the probe-side wireless communication unit 13 of the ultrasound probe 2 under the control of the main body control unit 29. In this case, the main body-side wireless communication unit 21 demodulates the transmission signal wirelessly transmitted from the probe-side wireless communication unit 13 to obtain sound ray signal. The main body-side wireless communication unit 21 sends the obtained sound ray signal to the image generation unit 22.

The main body-side wireless communication unit 21 modulates the carrier on the basis of control information or the like for controlling the ultrasound probe 2, generates a transmission signal representing the control information or the like, and wirelessly transmits the generated transmission signal to the probe-side wireless communication unit 13. Similarly to the modulation method used in the probe-side wireless communication unit 13, as the modulation method of the carrier, ASK, PSK, QPSK, 16QAM, and the like are used.

Figure 3:
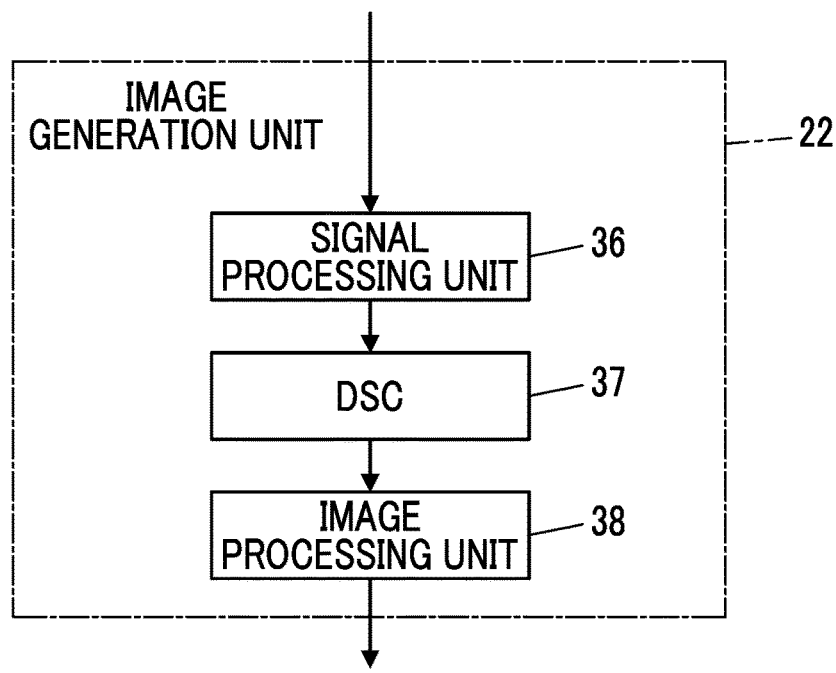
FIG. 3 is a block diagram illustrating a configuration of an image generation unit in the first embodiment of the present invention.

As illustrated in FIG. 3, the image generation unit 22 has a configuration in which a signal processing unit 36, a digital scan converter (DSC) 37, and an image processing unit 38 are sequentially connected in series.

The signal processing unit 36 generates a B-mode image signal, which is tomographic image information regarding tissues inside the subject, by performing, on the sound ray signal received from the main body-side wireless communication unit 21, correction of the attenuation due to the distance according to the depth of the reflection position of the ultrasonic wave using the basic sound speed value V1 set by the initial condition setting unit 25 and then performing envelope detection processing.

The DSC 37 converts (raster conversion) the B-mode image signal generated by the signal processing unit 36 into an image signal according to a normal television signal scanning method.

The image processing unit 38 performs various kinds of necessary image processing such as gradation processing on the B-mode image signal input from the DSC 37, and then sends the B-mode image signal to the display control unit 23 and the extraction unit 26. In the following, the B-mode image signal subjected to the image processing by the image processing unit 38 is simply referred to as an ultrasound image.

The display control unit 23 performs predetermined processing on the ultrasound image or the like generated by the image generation unit 22, and displays the ultrasound image or the like on the monitor 24, under the control of the main body control unit 29.

The monitor 24 performs various kinds of display under the control of the di splay control unit 23. The monitor 24 includes a display device such as a liquid crystal display (LCD), or an organic electroluminescence (EL) display.

The input device 30 is for inputting information regarding the ratio of mammary glands in the breast, which is calculated by analyzing the radiation image in which the breast of the subject is imaged, from an external device (not illustrated) such as a radiation image diagnostic apparatus to the diagnostic apparatus main body 3. The input device 30 is configured by, for example, a device for a user to perform an input operation, such as a keyboard, a mouse, a trackball, a touchpad, and a touch panel, and a connection terminal or the like for inputting data from an external device (not illustrated).

Figure 4:
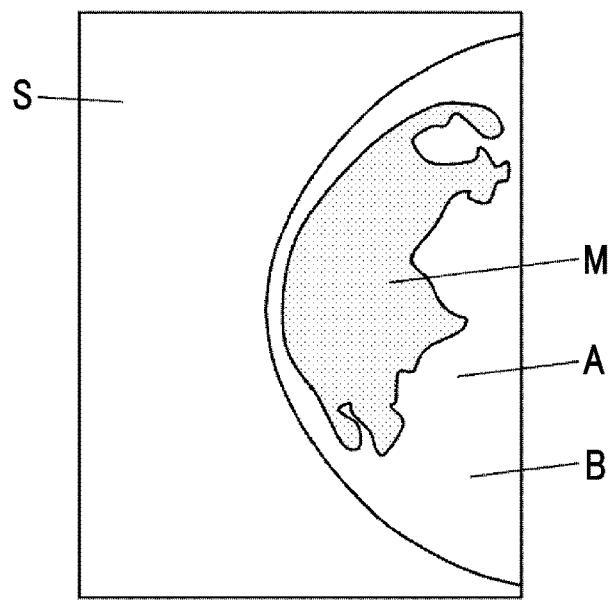
FIG. 4 is a diagram schematically illustrating an example of a radiation image used for calculation of a ratio of mammary glands.

In the calculation of the ratio of the mammary glands in the breast, for example, as illustrated in FIG. 4, a radiation image S in which a breast B of the subject is imaged by so-called mammography is used. In the mammography, normally, the breast B of the subject is placed between a detector for detecting the radiation and a radiation source, the radiation which is emitted from the radiation source and is attenuated through the breast B is detected by the detector, and thereby the radiation image S including pixels according to the intensity of the detected radiation is generated. In the breast B of the subject, the presence ratio of the mammary glands and the presence ratio of the fat differ depending on the location. Therefore, each pixel in the radiation image S has a brightness different from each other corresponding to the local transmittance of the breast B caused by the presence ratio of the mammary glands and the presence ratio of the fat.

Therefore, for example, it is possible to calculate the ratio of the mammary glands in the breast B by analyzing the radiation image S using a method disclosed in JP2010-253245A, calculating the presence ratio of the mammary glands in the corresponding imaging point and the thickness of the breast B at the imaging point for each pixel of the radiation image S, calculating the volume of the mammary glands, and dividing the calculated volume of the mammary glands by the volume of breast B. Here, the volume of the breast B is the volume of the breast B in a breast region A that is the entire region of the breast B shown in the radiation image S.

The initial condition setting unit 25 sets the basic sound speed value V1 for generating the ultrasound image of the breast B on the basis of the information on the ratio of the mammary glands in the breast B of the subject, which is input via the input device 30. The initial condition setting unit 25 can store a mammary gland sound speed value V11 (m/s) determined for the mammary glands, and a fat sound speed value V12 (m/s) determined for the fat, and set the basic sound speed value V1 (m/s) by V1=[R1×V11+(100−R1)×V12]/100 using a ratio R (%) of the mammary glands in the breast B of the subject, the mammary gland sound speed value V11 (m/s), and the fat sound speed value V12 (m/s).

Here, it is generally known that the breast B has a fat layer, a mammary gland layer, and a muscle layer. Among these, in the mammary gland layer, mammary glands and fat are mixed, and the presence ratios of the mammary glands and the fat in the mammary gland layer vary depending on the subject due to the individual differences, and thus the sound speed in the mammary gland layer also varies depending on the subject due to the individual differences. Therefore, in the ultrasound diagnostic apparatus in the related art, it is difficult to generate an ultrasound image in which the mammary gland layer is clearly depicted, using the sound speed suitable for the mammary gland layer.

With the initial condition setting unit 25, since the basic sound speed value V1 can be calculated in consideration of the ratio R of the breast B in the breast B of the subject, the ultrasound image in which the mammary gland layer is clearly shown can be generated in the image generation unit 22.

Figure 5:
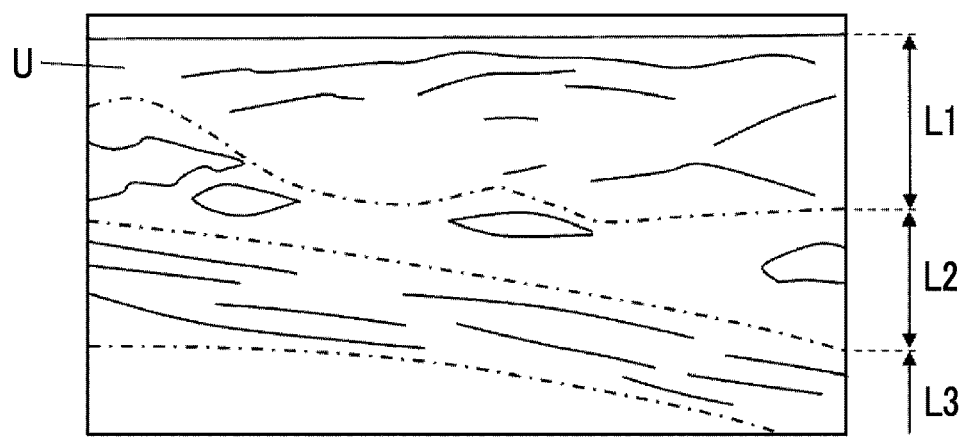
FIG. 5 is a diagram schematically illustrating an example of an ultrasound image generated in the first embodiment of the present invention.

The extraction unit 26 performs processing of analyzing the ultrasound image generated by the image generation unit 22 and extracting a fat layer L1, a mammary gland layer L2, and a muscle layer L3 present in the ultrasound image U, as illustrated in FIG. 5. As the method of extracting the fat layer L1, the mammary gland layer L2, and the muscle layer L3 from the ultrasound image U, for example, the extraction unit 26 can use a deep learning method such as so-called U-Net, a so-called template matching method, a machine learning method using a support vector machine (SVM), AdaBoost, and the like, a machine learning method described in Csurka et al.: Visual Categorization with Bags of Keypoints, Proc. of ECCV Workshop on Statistical Learning in Computer Vision, pp. 59-74 (2004), and the like.

The information on the fat layer L1, the mammary gland layer L2, or the muscle layer L3 extracted by the extraction unit 26 in this manner is transmitted from the main body-side wireless communication unit 21 to the probe-side wireless communication unit 13 via the main body control unit 29, is input from the probe-side wireless communication unit 13 to the probe control unit 16, and then is used in a case where the transmission and reception circuit 12 performs transmission and reception of the ultrasound beams to focus on the depth of the fat layer L1, the mammary gland layer L2, or the muscle layer L3 under the control of the probe control unit 16.

The main body-side processor 31 including the image generation unit 22, the display control unit 23, the initial condition setting unit 25, the extraction unit 26, and the main body control unit 29 is configured by a central processing unit (CPU) and a control program for causing the CPU to execute various kinds of processing, but the main body-side processor 31 may be configured by using a field programmable gate array (FPGA), a digital signal processor (DSP), an application specific integrated circuit (ASIC), a graphics processing unit (GPU), or other integrated circuits (IC) or may be configured by a combination thereof.

Further, the image generation unit 22, the display control unit 23, the initial condition setting unit 25, the extraction unit 26, and the main body control unit 29 of the main body-side processor 31 can also be configured by being integrated partially or entirely into one CPU or the like.

Hereinafter, the operation of generating the ultrasound image U according to the basic sound speed value V1 by the ultrasound diagnostic apparatus 1 according to the first embodiment of the present invention will be described.

The information representing the ratio R of the mammary glands in the breast B of the subject is input to the diagnostic apparatus main body 3 from the user or the external device such as a radiation image diagnostic apparatus via the input device 30. The information representing the ratio R of the mammary glands is sent to the initial condition setting unit 25 via the main body control unit 29.

Next, the initial condition setting unit 25 sets the basic sound speed value V1 used for generating the ultrasound image U, using the information representing the ratio R of the mammary glands in the breast B of the subject. For example, the initial condition setting unit 25 can store the mammary gland sound speed value V11 (m/s) determined for the mammary glands, and the fat sound speed value V12 (m/s) determined for the fat, and set the basic sound speed value V1 (m/s) by Expression (1) using the ratio R (%) of the mammary glands in the breast B of the subject, the mammary gland sound speed value V11 (m/s), and the fat sound speed value V12 (m/s).

The mammary gland layer L2 of the breast B of the subject is a layer in which the mammary glands and the fat are mixed, and in general, since there are individual differences in the presence ratio of the mammary glands and fat, there are also individual differences in the sound speed values in the mammary gland layer L2. The initial condition setting unit 25 can accurately calculate the basic sound speed value V1 corresponding to the sound speed value in the mammary gland layer L2 of the breast B of the subject in consideration of the ratio R of the mammary glands in the breast B of the subject.

The information on the basic sound speed value V1 set by the initial condition setting unit 25 is transmitted to the probe-side wireless communication unit 13 via the main body-side wireless communication unit 21, and further sent to the probe control unit 16.

The transmission and reception circuit 12 performs reception focusing processing using the basic sound speed value V1 set by the initial condition setting unit 25 to generate the sound ray signal under the control of the probe control unit 16. The sound ray signal generated by the transmission and reception circuit 12 in this manner is transmitted to the main body-side wireless communication unit 21 via the probe-side wireless communication unit 13, and further sent to the image generation unit 22. The image generation unit 22 generates the ultrasound image U as illustrated in FIG. 5 using the basic sound speed value V1 set by the initial condition setting unit 25 and the sound ray signal received from the main body-side wireless communication unit 21.

Here, it is generally known that the deviation between the sound speed value used for generating the ultrasound image U and the actual sound speed value in the corresponding site causes the deterioration of the resolution of the ultrasound image U. In the ultrasound diagnostic apparatus in the related art, a constant sound speed value stored in advance is often used as the sound speed value in the mammary gland layer, which has large individual differences, and there is a deviation between this sound speed value and the actual sound speed value in the mammary gland layer.

For example, even in a case where an optimal sound speed value for the mammary gland layer L2 is tried to be calculated by calculating the presence ratio of the mammary gland and fat in the mammary gland layer L2 from the ultrasound image U, since the entire mammary gland layer L2 is depicted in the ultrasound image U with high brightness regardless of the ratio R of the mammary glands in the mammary gland layer L2, it is difficult to calculate the ratio R of the mammary glands on the basis of the ultrasound image U.

Since the basic sound speed value V1 is calculated using the ratio R of the mammary glands calculated on the basis of the radiation image S, and accurately represents the actual sound speed value in the mammary gland layer L2 of the subject, the mammary gland layer L2 is clearly depicted in the ultrasound image U generated using the basic sound speed value V1 by the image generation unit 22.

The ultrasound image U generated by the image generation unit 22 in this manner is sent to the display control unit 23 to be subjected to the various kinds of processing, and then is displayed on the monitor 24.

As described above, the basic operation of the ultrasound diagnostic apparatus 1 according to the first embodiment of the present invention is completed.

In addition to the operation described above, it is possible to generate the ultrasound image U in which the mammary gland layer L2 is more clearly depicted, by performing the transmission and reception of the ultrasound beams to focus on the depth of the mammary gland layer L2, for example.

In this case, the ultrasound image U generated by the image generation unit 22 is also sent to the extraction unit 26.

The extraction unit 26 analyzes the ultrasound image U, and extracts the fat layer L1, the mammary gland layer L2, and the muscle layer L3 of the breast B of the subject, from the ultrasound image U as illustrated in FIG. 5. The information on the depth of the fat layer L1, the mammary gland layer L2, and the muscle layer L3, which are extracted in this manner, in the ultrasound image U is sent to the main body control unit 29. For example, by the user's input operation via the input device 30, the information on the depth of the fat layer L1, the mammary gland layer L2, or the muscle layer L3 in the ultrasound image U is transmitted from the main body control unit 29 to the probe-side wireless communication unit 13 via the main body-side wireless communication unit 21, and further sent to the probe control unit 16.

The transmission and reception circuit 12 performs the transmission and reception of the ultrasound beam to focus on the depth of the fat layer L1, the mammary gland layer L2, or the muscle layer L3 on the basis of the information on the depth of the fat layer L1, the mammary gland layer L2, or the muscle layer L3 in the ultrasound image U, under the control of the probe control unit 16. The transmission and reception circuit 12 newly generates reception data, and the image generation unit 22 newly generates an ultrasound image U focused on the depth of the fat layer L1, the mammary gland layer L2, or the muscle layer L3.

For example, in a case where an instruction to focus on the mammary gland layer L2 is input by the user via the input device 30, the information on the depth of the mammary gland layer L2 in the ultrasound image U is transmitted from the main body control unit 29 to the probe-side wireless communication unit 13 via the main body-side wireless communication unit 21, and further sent to the probe control unit 16. The probe control unit 16 controls the transmission and reception circuit 12 to focus on the mammary gland layer L2. Thereby, a sound ray signal is newly generated in the transmission and reception circuit 12, and an ultrasound image U is newly generated by the image generation unit 22 on the basis of the sound ray signal. In the ultrasound image U generated in this manner, the depth of the mammary gland layer L2 is focused, the mammary gland layer L2 is more clearly depicted.

As described above, with the ultrasound diagnostic apparatus 1 according to the first embodiment of the present invention, the basic sound speed value V1 is set by the initial condition setting unit 25 on the basis of the ratio R of the mammary glands in the breast B of the subject, the sound ray signal is generated by the transmission and reception circuit 12 using the basic sound speed value V1, and the ultrasound image U is generated by the image generation unit 22 using the sound ray signal. Therefore, it is possible to improve the resolution of the ultrasound image U of the mammary gland layer L2.

In the ultrasound diagnostic apparatus 1, the image generation unit 22 is provided in the diagnostic apparatus main body 3, but may be provided in the ultrasound probe 2 instead of being provided in the diagnostic apparatus main body 3. In this case, the information on the basic sound speed value V1 set by the initial condition setting unit 25 is transmitted to the probe-side wireless communication unit 13 via the main body-side wireless communication unit 21, and further sent to the image generation unit 22 in the ultrasound probe 2. Further, the ultrasound image U generated by the image generation unit 22 is transmitted to the main body-side wireless communication unit 21 via the probe-side wireless communication unit 13, and further sent to the display control unit 23 and the extraction unit 26.

It has been described that the ultrasound probe 2 and the apparatus main body 3 are connected to each other by wireless communication, but the ultrasound probe 2 and the diagnostic apparatus main body 3 can be connected to each other by wired communication.

The diagnostic apparatus main body 3 may be a portable so-called handheld type, which consists of a tablet terminal or the like, or may be a stationary type installed in a medical field such as a hospital.

An example has been described in which the ultrasound image U focused on the depth of the mammary gland layer L2 is generated, but the ultrasound image U focused on the fat layer L1 or the muscle layer L3 may be generated.

For example, in a case where an instruction to focus on the fat layer L1 is input by the user via the input device 30, the information on the depth of the fat layer L1 in the ultrasound image U is transmitted to the probe-side wireless communication unit 13 via the main body-side wireless communication unit 21, and further sent from the probe-side wireless communication unit 13 to the probe control unit 16.

The main body control unit 29 stores the fat sound speed value V12, and transmits the information representing the fat sound speed value V12 to the probe-side wireless communication unit 13 via the main body-side wireless communication unit 21 on the basis of the information representing the instruction to focus on the depth of the fat layer L1 input by the user. The information representing the fat sound speed value V12 is sent from the probe-side wireless communication unit 13 to the transmission and reception circuit 12 via the probe control unit 16.

The transmission and reception circuit 12 performs the transmission and reception of the ultrasound beam to focus on the depth of the fat layer L1, and performs the reception focusing processing using the fat sound speed value V12 to generate the sound ray signal under the control of the probe control unit 16. The sound ray signal generated in this manner is transmitted from the probe-side wireless communication unit 13 to the main body-side wireless communication unit 21, and further sent to the image generation unit 22. The image generation unit 22 generates the ultrasound image U on the basis of the sound ray signal received from the main body-side wireless communication unit 21. In the ultrasound image U, the fat layer L1 is clearly depicted.

For example, the main body control unit 29 stores a muscle sound speed value V13 that is different from the basic sound speed value V1 and the fat sound speed value V12 and is determined for the muscle in advance, and in a case where an instruction to focus on the muscle layer L3 is input by the user via the input device 30, an ultrasound image U focused on the depth of the muscle layer L3 can be generated using the muscle sound speed value V13.

An example has been described in which the ratio R of the mammary glands in the breast B of the subject is calculated as the ratio of the volume of the mammary gland with respect to the volume of the breast region A, but a ratio calculated in other methods may be used.

For example, as illustrated in FIG. 4, it is possible to calculate the ratio R of the mammary glands by recognizing, in the breast region A, a region having brightness higher than a certain value, that is, a region having a high density of mammary glands as a mammary gland region M, calculating the volume of the mammary gland region M and the volume of the mammary glands using the method disclosed in JP2010-253245A, and dividing the calculated volume of the mammary glands by the volume of the mammary gland region M. Thereby, it is possible to exclude the influence of the region configured by almost only fat, which is present around the mammary gland region M, it is possible to calculate the value of the ratio R of the mammary glands having a higher correlation with the ratio of the mammary glands in the mammary gland layer L2 shown in the ultrasound image U rather than calculating the ratio R of the mammary glands using the ratio of the volume of the mammary glands with respect to the volume of the breast region A. Therefore, the initial condition setting unit 25 can calculate the basic sound speed value V1 more accurately representing the sound speed value in the mammary gland layer L2.

Figure 6:
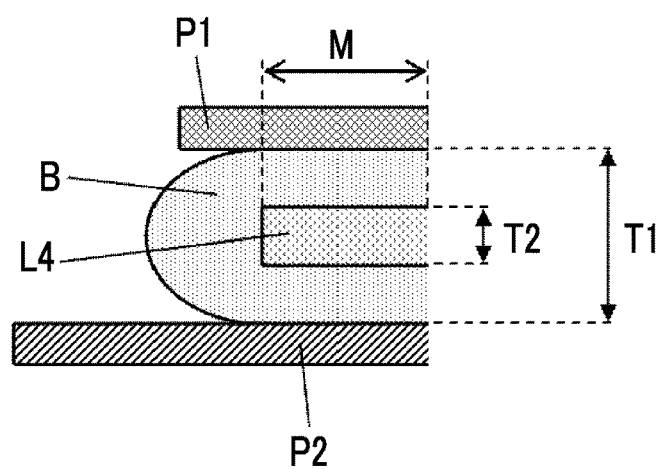
FIG. 6 is a diagram schematically illustrating a breast examined using a tomosynthesis method.

As illustrated in FIG. 6, in a state where the breast B of the subject is sandwiched between a compression plate P1 and an imaging table P2, so-called tomosynthesis is performed on the breast B, a breast thickness T1 in the mammary gland region M and a thickness T2 of a mammary gland layer L4 in the mammary gland region M are calculated, and the ratio of the thickness T2 of the mammary gland layer L4 with respect to the breast thickness T1 can be calculated as the ratio R of the mammary glands.

Here, the mammary gland layer L4 is a layer obtained by extracting a region depicted with high brightness in the tomosynthesis image obtained by the tomosynthesis. The mammary gland layer L4 is a region in which the fat and mammary glands are mixed but the ratio of the mammary glands is relatively high, and a region other than the mammary gland layer L4 is a region configured by almost fat, such as subcutaneous fat. The mammary gland layer L4 does not strictly match the mammary gland layer L2 in the ultrasound image U, but the mammary gland layer L4 has a high correlation with the mammary gland layer L2 in the ultrasound image U.

The region depicted with high brightness in the tomosynthesis image is a region having brightness equal to or higher than a predetermined brightness threshold value, for example.

In a case where the ratio R of the mammary glands is represented by the ratio R1(%) of the mammary glands calculated using the ratio of the volume of the mammary glands with respect to the volume of the mammary gland region M, and the ratio R2(%) of the thickness T2 of the mammary gland layer L4 with respect to the breast thickness T1 obtained by tomosynthesis, the initial condition setting unit 25 can set the basic sound speed value V1 by $V1=(R1/R2) \times V11+(1-R1/R2) \times V12$ using the ratio R1(%) of the mammary glands, the ratio R2(%) of the thickness T2 of the mammary gland layer L4, the mammary gland sound speed value V11 (m/s), and the fat sound speed value V12 (m/s).

Here, usually, the mammary glands in the mammary gland region M are mostly present in the mammary gland layer L4, and therefore, the ratio of the volume of the mammary glands with respect to the volume of the mammary gland region M can be approximated as the ratio of the mammary glands present in the mammary gland layer L4 with respect to the breast thickness T1 obtained by tomosynthesis. Accordingly, it is possible to calculate the ratio of the mammary glands in the mammary gland layer L4 by dividing the ratio R1 by the ratio R2.

Thereby, the initial condition setting unit 25 can calculate the basic sound speed value V1 more accurately representing the sound speed value in the mammary gland layer L2.

Second Embodiment

In the first embodiment, the ratio R of the mammary glands is input to the ultrasound diagnostic apparatus 1 from the user or the external device (not illustrated) via the input device 30. However, the ratio R of the mammary glands can be calculated by analyzing the radiation image S in the ultrasound diagnostic apparatus 1.

Figure 7:
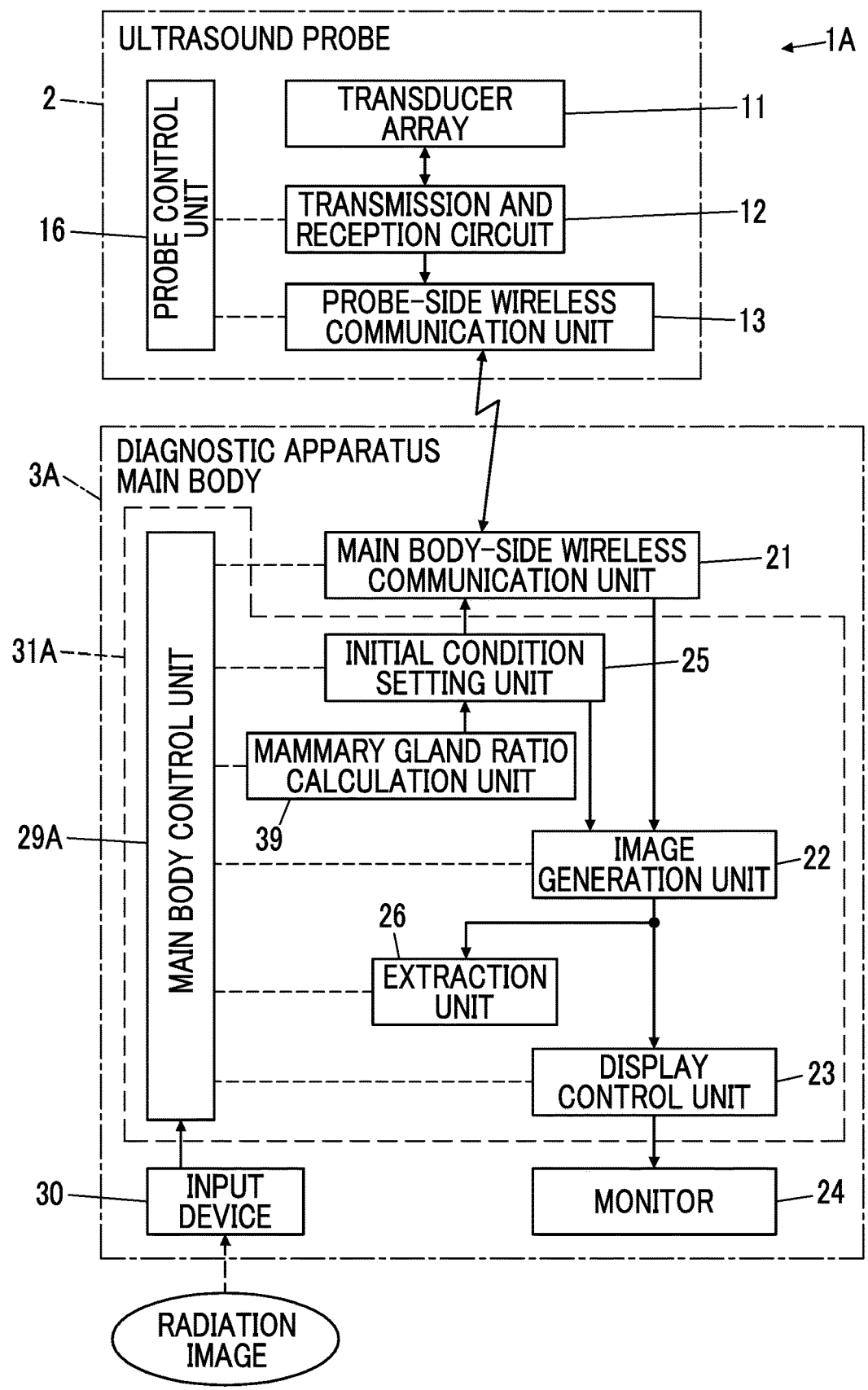
FIG. 7 is a block diagram illustrating a configuration of an ultrasound diagnostic apparatus according to a second embodiment of the present invention.

FIG. 7 illustrates a configuration of an ultrasound diagnostic apparatus 1A according to a second embodiment of the present invention. The ultrasound diagnostic apparatus 1A is obtained by including a diagnostic apparatus main body 3A instead of the diagnostic apparatus main body 3 in the ultrasound diagnostic apparatus 1 of the first embodiment illustrated in FIG. 1.

The diagnostic apparatus main body 3A is obtained by adding a mammary gland ratio calculation unit 39 and including a main body control unit 29A instead of the main body control unit 29, in the diagnostic apparatus main body 3 in the first embodiment. The mammary gland ratio calculation unit 39 is connected to the initial condition setting unit 25. Further, instead of the main body-side processor 31, a main body-side processor 31A including the mammary gland ratio calculation unit 39 is configured.

The input device 30 is used for inputting the radiation image S in which the breast B of the subject is imaged by mammography or the like, to the diagnostic apparatus main body 3A from the external device (not illustrated) such as a radiation image diagnostic apparatus.

The mammary gland ratio calculation unit 39 calculates the ratio R of the mammary glands by analyzing the radiation image S input via the input device 30. For example, the mammary gland ratio calculation unit 39 can calculate the ratio R of the mammary glands by calculating the volume of the breast region A and the volume of the mammary glands for the radiation image S acquired by the mammography as illustrated in FIG. 4, using the method disclosed in JP2010-253245A, and dividing the calculated volume of the mammary glands by the volume of the breast region A.

The mammary gland ratio calculation unit 39 can calculate the ratio R of the mammary glands by recognizing, in the breast region A, a region having brightness higher than a certain value, that is, a region having a high density of mammary glands as the mammary gland region M, calculating the volume of the mammary gland region M and the volume of the mammary glands using the method disclosed in JP2010-253245A, and dividing the calculated volume of the mammary glands by the volume of the mammary gland region M.

The radiation image S obtained by the tomosynthesis as illustrated in FIG. 6 is analyzed, the breast thickness T1 in the mammary gland region M and the thickness T2 of the mammary gland layer L4 in the mammary gland region M are calculated, and the ratio of the thickness T2 of the mammary gland layer L4 with respect to the breast thickness T1 can be calculated as the ratio R of the mammary glands.

As described above, even in a case where the ratio R of the mammary glands is calculated by the mammary gland ratio calculation unit 39 of the diagnostic apparatus main body 3A, as in the case where the ratio R of the mammary glands is input to the ultrasound diagnostic apparatus 1 from the user or the external device (not illustrated) via the input device 30 in the first embodiment, the basic sound speed value V1 is set by the initial condition setting unit 25 on the basis of the ratio R of the mammary glands in the breast B of the subject, the sound ray signal is generated by the transmission and reception circuit 12 using the basic sound speed value V1, and the ultrasound image U is generated by the image generation unit 22 using the sound ray signal. Therefore, it is possible to improve the resolution of the ultrasound image U of the mammary gland layer L2.

EXPLANATION OF REFERENCES 1, 1A: ultrasound diagnostic apparatus
2: ultrasound probe
3, 3A: diagnostic apparatus main body
11: transducer array
12: transmission and reception circuit
13: probe-side wireless communication unit
16: probe control unit
21: main body-side wireless communication unit
22: image generation unit
23: display control unit
24: monitor
25: initial condition setting unit
26: extraction unit
29, 29A: main body control unit
30: input device
31, 31A: main body-side processor
32: pulser
33: amplification unit
34: AD conversion unit
35: beam former
36: signal processing unit
37: DSC
38: image processing unit
39: mammary gland ratio calculation unit
A: breast region
B: breast
L1: fat layer
L2: mammary gland layer
L3: muscle layer
M: mammary gland region
P1: compression plate
P2: imaging table
S: radiation image
T1: breast thickness
T2: thickness
U: ultrasound image

What is claimed is:

1. An ultrasound diagnostic apparatus comprising:
an ultrasound probe;
a processor configured to
generate an ultrasound image by performing transmission and reception of an ultrasound beam with respect to a subject using the ultrasound probe,
acquire tomosynthesis images of a breast of the subject which are captured by performing a tomosynthesis for the breast sandwiched between a first plate and a second plate,
set a basic sound speed value for generating the ultrasound image of a breast of the subject based on a ratio of mammary glands in the breast, which is calculated by analyzing a radiation image in which the breast is imaged, where the ratio of the mammary glands is represented by a ratio R1 of a volume of the mammary glands in a mammary gland region with respect to a volume of the breast in the mammary gland region, and a ratio R2 of a thickness of a mammary gland layer in the mammary gland region with respect to a breast thickness in the mammary gland region calculated from the tomosynthesis images, where the breast thickness in the mammary gland region is calculated from a lower surface of the first plate and an upper surface of the second plate,
wherein the processor is further configured to generate the ultrasound image of the breast using the basic sound speed value.

2. The ultrasound diagnostic apparatus according to claim 1,
the processor is further configured to extract a fat layer and a mammary gland layer by analyzing the ultrasound image of the breast.

3. The ultrasound diagnostic apparatus according to claim 2,
wherein the processor is further configured to generate the ultrasound image using the basic sound speed value for the mammary gland layer which is extracted.

4. The ultrasound diagnostic apparatus according to claim 2,
wherein the processor is further configured to generate the ultrasound image using a fat sound speed value different from the basic sound speed value for the fat layer which is extracted.

5. The ultrasound diagnostic apparatus according to claim 2,
wherein the processor is further configured to
extract a muscle layer by analyzing the ultrasound image of the breast, and
generate the ultrasound image using a muscle sound speed value that is different from the basic sound speed value and a fat sound speed value and is determined for muscle, for the extracted muscle layer.

6. The ultrasound diagnostic apparatus according to claim 3,
wherein the processor is further configured to
extract a muscle layer by analyzing the ultrasound image of the breast, and
generate the ultrasound image using a muscle sound speed value that is different from the basic sound speed value and a fat sound speed value and is determined for muscle, for the extracted muscle layer.

7. The ultrasound diagnostic apparatus according to claim 4,
wherein the processor is further configured to
extract a muscle layer by analyzing the ultrasound image of the breast, and
generate the ultrasound image using a muscle sound speed value that is different from the basic sound speed value and the fat sound speed value and is determined for muscle, for the extracted muscle layer.

8. The ultrasound diagnostic apparatus according to claim 1,
wherein the processor is further configured to set the basic sound speed value using the ratio of the mammary glands input by a user.

9. The ultrasound diagnostic apparatus according to claim 2,
wherein the processor is further configured to set the basic sound speed value using the ratio of the mammary glands input by a user.

10. The ultrasound diagnostic apparatus according to claim 3,
wherein the processor is further configured to set the basic sound speed value using the ratio of the mammary glands input via by a user.

11. The ultrasound diagnostic apparatus according to claim 1,
wherein the processor is further configured to
calculate the ratio of the mammary glands by analyzing the radiation image input from an external device, and
set the basic sound speed value using the ratio of the mammary glands.

12. The ultrasound diagnostic apparatus according to claim 2,
wherein the processor is further configured to
calculate the ratio of the mammary glands by analyzing the radiation image input from an external device, and
set the basic sound speed value using the ratio of the mammary glands.

13. The ultrasound diagnostic apparatus according to claim 1,
wherein the ratio of the mammary glands is a ratio of a volume of the mammary glands in a breast region with respect to a volume of the breast in the breast region.

14. The ultrasound diagnostic apparatus according to claim 1,
wherein the ratio of the mammary glands is a ratio of a volume of the mammary glands in a mammary gland region with respect to a volume of the breast in the mammary gland region.

15. The ultrasound diagnostic apparatus according to claim 1,
wherein the processor is further configured to set a basic sound speed value V1 (m/s) by $V1=(R1/R2)\times V11+(1-R1/R2)\times V12$ using the ratio R1(%) of the volume of the mammary glands, the ratio R2 of the thickness of the mammary gland layer, a mammary gland sound speed value V11 (m/s) determined for the mammary glands, and a fat sound speed value V12 (m/s) determined for fat.

16. A control method of an ultrasound diagnostic apparatus, the control method comprising:
acquiring tomosynthesis images of a breast of a subject which are captured by performing a tomosynthesis for the breast sandwiched between a first plate and a second plate,
setting a basic sound speed value for generating an ultrasound image on the basis of a ratio of mammary glands in a breast of a subject, which is calculated by analyzing a radiation image in which the breast is imaged, where the ratio of the mammary glands is represented by a ratio R1 of a volume of the mammary glands in a mammary gland region with respect to a volume of the breast in the mammary gland region, and a ratio R2 of a thickness of a mammary gland layer in the mammary gland region with respect to a breast thickness in the mammary gland region calculated from the tomosynthesis images, where the breast thickness in the mammary gland region is calculated from a lower surface of the first plate and an upper surface of the second plate; and
generating the ultrasound image of the breast using the basic sound speed value.

* * * * *